US009987579B2

(12) United States Patent
Ishida et al.

(10) Patent No.: US 9,987,579 B2
(45) **Date of Patent: *Jun. 5, 2018**

(54) OIL SEPARATOR

(71) Applicant: TOKYO ROKI CO., LTD., Yokohama-shi, Kanagawa (JP)

(72) Inventors: Kosaku Ishida, Yokohama (JP); Yoshitaka Watanabe, Yokohama (JP); Kazuo Tanaka, Yokohama (JP); Takayuki Hoshi, Yokohama (JP); Takatsugu Kurosawa, Yokohama (JP)

(73) Assignee: Tokyo Roki Co., Ltd., Yokohama-shi, Kanagawa (JP)

( * ) Notice: Subject to any disclaimer, the term of this patent is extended or adjusted under 35 U.S.C. 154(b) by 84 days.

This patent is subject to a terminal disclaimer.

(21) Appl. No.: 14/779,885

(22) PCT Filed: Mar. 28, 2013

(86) PCT No.: PCT/JP2013/059295

§ 371 (c)(1),
(2) Date: Sep. 24, 2015

(87) PCT Pub. No.: WO2014/155613

PCT Pub. Date: Oct. 2, 2014

(65) Prior Publication Data

US 2016/0082378 A1 Mar. 24, 2016

(51) Int. Cl.
*B01D 45/00* (2006.01)
*B01D 45/14* (2006.01)
(Continued)

(52) U.S. Cl.
CPC ............. *B01D 45/14* (2013.01); *B01D 45/12* (2013.01); *B04B 5/005* (2013.01); *F01M 13/04* (2013.01);
(Continued)

(58) Field of Classification Search
CPC ........ B01D 45/14; B01D 45/12; F01M 13/04; F01M 2013/0422; B04B 5/005; B04B 2005/125
See application file for complete search history.

(56) References Cited

U.S. PATENT DOCUMENTS 7,077,881 B2 * 7/2006 Franzen ................ B01D 45/14 210/512.1
7,081,146 B2 * 7/2006 Hallgren ................ B01D 45/12 210/512.1
(Continued)

FOREIGN PATENT DOCUMENTS

DE 102008033638 A1 2/2009
JP 2001-336413 A 12/2001
(Continued)

OTHER PUBLICATIONS

International Preliminary Report on Patentability, Application No. PCT/JP2013/059295, dated Oct. 8, 2015.
(Continued)

*Primary Examiner* — Dung H Bui
(74) *Attorney, Agent, or Firm* — Harness, Dickey & Pierce, P.L.C.

(57) ABSTRACT

An oil separator includes a plurality of separation discs rotatable together with a spindle and layered in an axis direction of the spindle, a nozzle that protrudes from a lower circumferential face of the spindle and configured to rotate the spindle by injection of an oil, a lower case has a gas inflow part into which blow-by gas flows, an oil discharge part into which an oil after separation is discharged, an upper case that sections together with the lower case a housing chamber in which spindle, separation discs and nozzle are housed, and a sectioning member that sections the housing chamber into a primary separation chamber, configured to primarily separate the oil mist, and a secondary separation
(Continued)

chamber that secondarily separates the oil mist included in the gas after primary separation, and forms between the nozzle and the separation discs a communication opening that guides the gas being treated.

9 Claims, 11 Drawing Sheets

(51) Int. Cl.
*B01D 45/12* (2006.01)
*B04B 5/00* (2006.01)
*F01M 13/04* (2006.01)
*B04B 5/12* (2006.01)

(52) U.S. Cl.
CPC .................. *B04B 2005/125* (2013.01); *F01M 2013/0422* (2013.01)

(56) References Cited

U.S. PATENT DOCUMENTS 7,811,347 B2 * 10/2010 Carlsson ................ B01D 45/14 55/385.3
2002/0088445 A1 7/2002 Weindorf et al.
2003/0233939 A1 * 12/2003 Szepessy ............... B01D 45/14 95/270
2005/0198932 A1 9/2005 Franzen et al.

FOREIGN PATENT DOCUMENTS

JP 2005-515065 A 5/2005
JP 2008-501505 A 1/2008
WO WO-03/061838 A1 7/2003
WO WO-2005/119020 A1 12/2005

OTHER PUBLICATIONS

Japanese Office Action for parallel application JP 2015-507809, dated Aug. 30, 2016, with English Translation thereof.
Extended European Search Report for parallel application EP 13880183.2. dated Oct. 26, 2016.
International Search Report (English and Japanese) for PCT/JP2013/059295, ISA/JP, dated Jun. 25, 2013.
Written Opinion of the ISA (Japanese) for PCT/JP2013/059295, ISA/JP, dated Jun. 25, 2013.

* cited by examiner

OIL SEPARATOR

CROSS-REFERENCE TO RELATED APPLICATIONS

This application is a 371 U.S. National Stage of International Application No. PCT/JP2013/059295, filed Mar. 28, 2013. The entire disclosures of the above application are incorporated herein by reference.

TECHNICAL FIELD

The present invention relates to an oil separator that separates oil in a mist form (hereinafter oil mist) included in gas which is a target of treatment.

BACKGROUND ART

An oil separator that separates oil mist included in gas which is a target of treatment is known. For example, the oil separator disclosed in PTL1 separates oil mist using centrifugal force created by a rotating member arranged between the inlet and the outlet for the gas.

This oil separator has hermetically partitioned a separation space where a rotating member is housed and a drive space where a driving mechanism for rotating this rotating member is housed. The rotating member includes a rotary shaft and a plurality of separation discs that are layered along the axis direction of this rotary shaft. The rotary shaft is attached with the axis line being along the vertical direction and a driving mechanism for rotating the rotary shaft about the axis is attached at the lower end part of the rotary shaft. For example, a nozzle for injecting oil and a set of vanes to which oil is sprayed, or a motor is used in the driving mechanism.

CITATION LIST

Patent Literature

[PTL 1] Japanese translation of PCT International application No. 2008-501505

SUMMARY OF INVENTION

Technical Problem

The conventional oil separator has the rotary shaft attached along the vertical direction so that the drive space is arranged below the separation space. Since the drive space and the separation space are divided, the gas which is the target of treatment is introduced from above the separation space and discharged from the side of the separation space. A structure that discharges gas which is the target of treatment from the side of the separation space in this way would have the portion that discharges gas jut out sideways which would upsize the device by a corresponding amount. Additionally, there is a desire for the oil separators of this type to have the separation efficiency improved.

The present invention has been made in view of such circumstances, and an objective thereof is to allow minimization of an oil separator while improving the separation efficiency in the oil separator that separates from gas oil mist included in a gas which is a target of treatment.

Solution to Problem

One aspect of the present invention to achieve the foregoing objective is an oil separator which separates an oil mist included in a gas which is a target of treatment, including a plurality of separation discs which are provided rotatable together with a spindle and are layered in an axis direction of the spindle, a nozzle which is provided to protrude from a circumferential face of the spindle below the separation discs and configured to rotate the spindle about an axis line by injection of an oil, a lower case which is provided with a gas inflow part into which the gas being the target of treatment flows and an oil discharge part into which an oil after separation is discharged, an upper case which is attached from above the lower case and sections together with the lower case a housing chamber in which the spindle, the separation discs and the nozzle are housed, and a sectioning member which sections the housing chamber into a primary separation chamber configured to allow an oil injected from the nozzle to flow down as well as to primarily separate the oil mist included in the gas being the target of treatment which has flown in from the gas inflow part and into a secondary separation chamber in which the separation discs are arranged and which secondarily separates the oil mist included in the gas being the target of treatment from which the oil mist has been primarily separated, and at the same time forms between the nozzle and the separation discs a communication opening which guides into the secondary separation chamber the gas being the target of treatment in the primary separation chamber.

According to the present invention, the housing chamber is partitioned into a primary separation chamber and a secondary separation chamber where the primary separation chamber has introduced therein a gas which is the target of treatment as well as has injected therein an oil which becomes the driving source so that the primary separation chamber can be used for multiple purposes permitting minimization of the device. Here, in the primary separation chamber, a part of the gas being the target of treatment comes into contact with the oil which has been injected from the nozzle for the oil mist to be taken into the oil. Hereby, the oil mist is primarily separated. Then the gas being the target of treatment, after the oil mist is primarily separated, is guided to the secondary separation chamber through a communication opening. Since the secondary separation chamber only has to perform secondary separation on the remaining oil mist, the separation efficiency of the oil mist can be improved. Further, the number of separation discs can be lessened and the diameters of the separation discs can be reduced which also allows the device to be minimized.

In the aforementioned oil separator it is preferable that the sectioning member has a diameter reduced toward above and has an upper end thereof set as the communication opening, and includes a tapered part whose inner face has sprayed thereagainst the oil injected from the nozzle. In this oil separator, the oil that has been injected from the nozzle flows downward by being sprayed against the inner face of the tapered part. Hereby, the problem of the oil flowing into the upper housing chamber can be restrained.

In the aforementioned oil separator it is preferable that the gas inflow part and the oil discharge part are structured with a common tubular member. The structure of this oil separator can be simplified. Further, the oil which has been injected from the nozzle and the oil which has been separated from the gas being the target of treatment can be discharged together.

In the aforementioned oil separator it is preferable that the oil separator further includes a spindle shaft which rotatably supports the spindle and has formed on an inner side thereof an oil feeding path for feeding the oil, wherein a space between the spindle and the spindle shaft functions as an oil guide path for guiding to the separation discs a part of the oil fed to be injected from the nozzle. With this oil separator, the oil which has been guided through the oil guiding path cleans the surface of the separation discs so that the maintenance of the separation discs can be simplified.

In the aforementioned oil separator it is preferable that a gas discharge part is provided to an upper end part of the upper case and discharges a post treated gas having the oil mist separated. With this oil separator, gas after treatment is discharged from the upper end part of the upper case so that oil is restrained from mixing into the gas after treatment.

In the aforementioned oil separator it is preferable that the separation discs are annular plate materials inclined downward toward an outer circumferential side. With this oil separator, the oil which has been separated with the separation discs flows downward so that the oil can be restrain from mixing into the gas after treatment.

Advantageous Effects of Invention

According to the present invention, the separation efficiency can be improved while making the device compact in an oil separator which separates from gas oil mist included in a gas which is a target of treatment.

DESCRIPTION OF EMBODIMENTS

Figure 1:
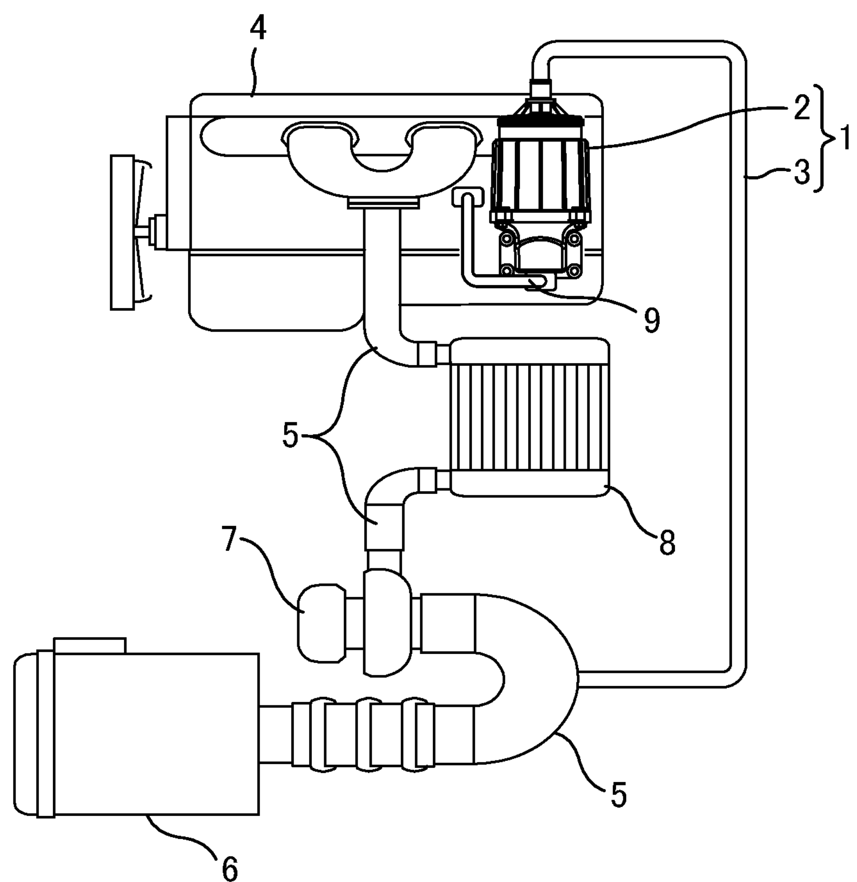
FIG. 1 is a schematic diagram illustrating a closed type crankcase ventilation system.

Description of the embodiments according to the present invention will be given in the following with reference to the drawings. Here, description will be given taking the closed type crankcase ventilation system 1 (hereinafter, referred to as ventilation system 1) as an example.

The ventilation system 1 includes an oil separator 2 and a breather pipe 3, as shown in the figure. The oil separator 2 treats the blow-by gas (corresponding to the gas being the target of treatment including oil mist) discharged from an engine 4 to separate the oil mist. The oil separator 2 in the present embodiment is mounted on the side face of the engine 4. The breather pipe 3 sections the flow path for returning the post treated blow-by gas discharged from the oil separator 2 to an air intake side flow path 5 of the engine 4.

In this ventilation system 1, the blow-by gas discharged from the engine 4 is introduced into the oil separator 2 provided to the side face of the engine 4. Then the oil separated with the oil separator 2 is returned to the engine 4. Meanwhile, the post treated blow-by gas after being discharged from the upper end part of the oil separator 2 is returned to the air intake side flow path 5 through the breather pipe 3. Specifically, the post treated blow-by gas is returned to the section which couples an air filter 6 and a turbo charger 7 in the air intake side flow path 5. The returned blow-by gas is mixed with fresh air sent from the air filter 6 and compressed by the turbo charger 7 and thereafter, cooled in a charge cooler 8 to be fed to the engine 4.

Figure 2:
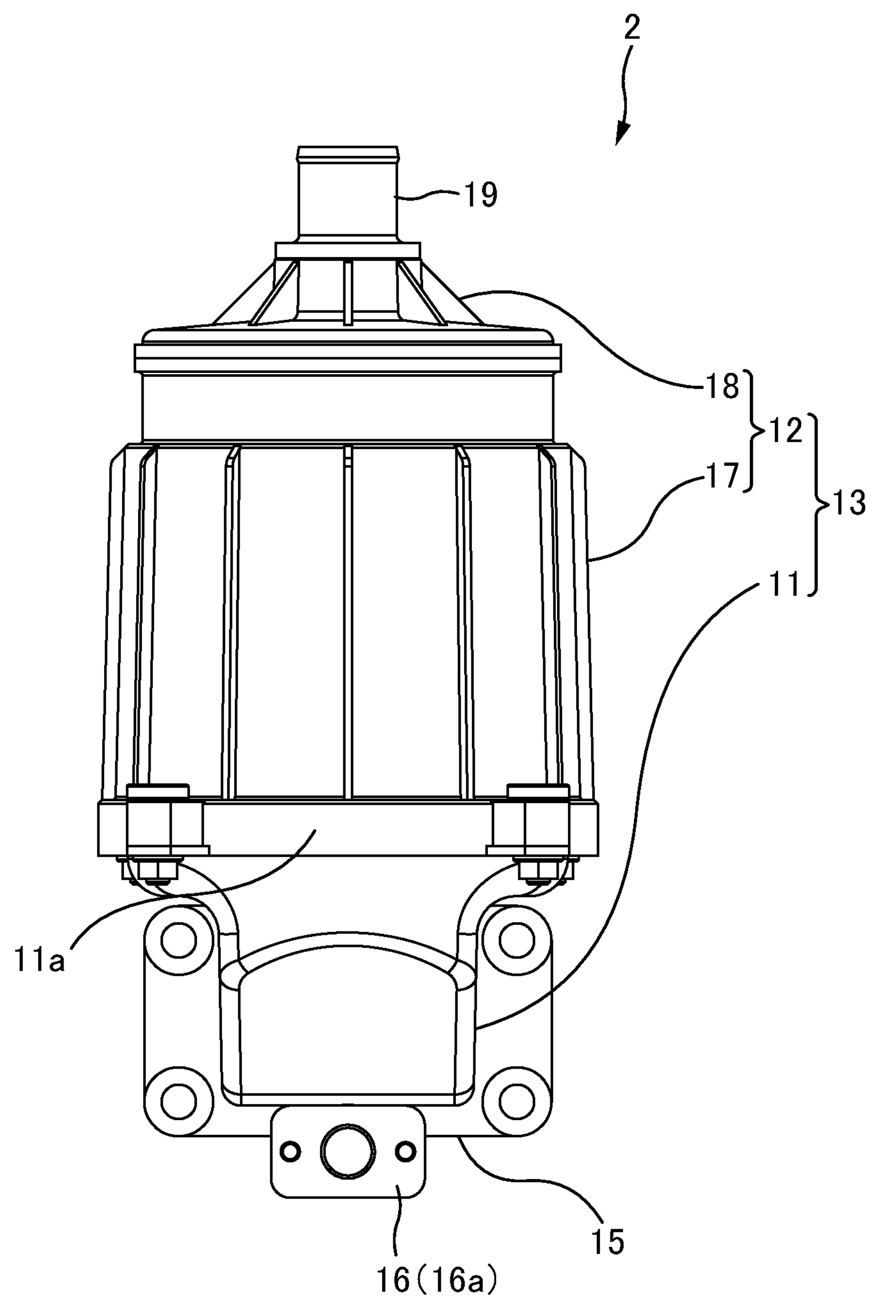
FIG. 2 is a front view of an oil separator.
Figure 3A:
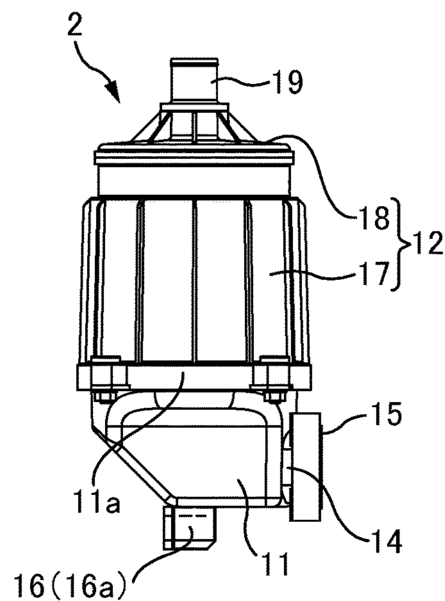
FIG. 3A is a right side view of the oil separator.
Figure 3B:
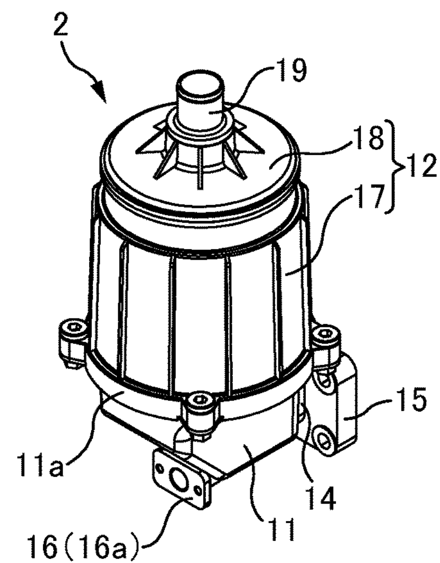
FIG. 3B is a perspective view of the oil separator seen from the upper right side of the front of the oil separator.
Figure 3C:
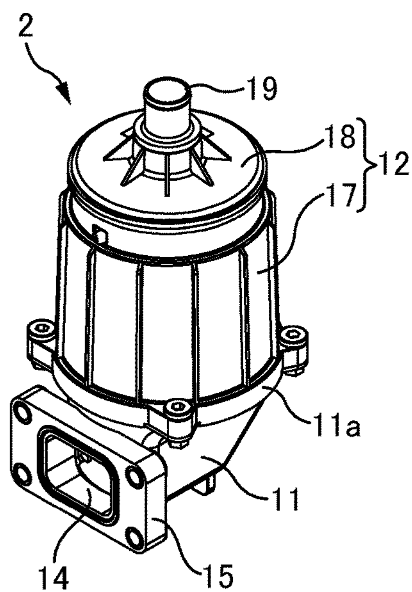
FIG. 3C is a perspective view of the oil separator seen from the upper left side of the back of the oil separator.
Figure 3D:
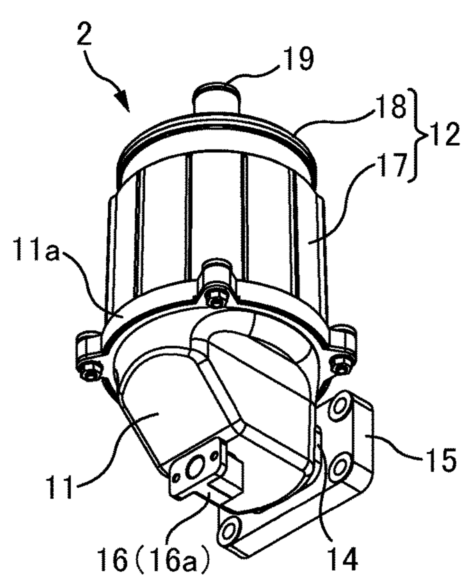
FIG. 3D is a perspective view of the oil separator seen from the lower right side of the front of the oil separator.

Description of the oil separator 2 will be given next. As illustrated in FIGS. 2 and 3, this oil separator 2 has a housing 13 including a lower case 11 and an upper case 12. A rotor unit, a PCV valve and the like are arranged in the inner space (housing chamber) of the housing 13. Description of the rotor unit and the PCV valve will be given later.

The lower case 11 is a section which partitions the lower section of the housing 13 and is structured with a box-like member having a bottom face with the upper face being open. The upper end part of the lower case 11 is provided with a circular fitting part 11*a* which fits together with the lower end part of the upper case 12. A communication tube part 14 facing rearward and communicating with the engine 4 is provided on the back face of the lower case. This communication tube part 14 is a tubular member which functions as a gas inflow part into which blow-by gas flows as well as an oil discharge part from which oil after separation is discharged. The tip part of the communication tube part 14 is provided with a flange 15 which is to be joined to the side face of the engine 4. In the present embodiment, the lower case 11, the engine 4 and the like are made of cast metal, however, they may be made by molding resin.

The bottom face of the lower case 11 is provided with a connecting part 16*a* of an elbow pipe 16 in a protruding manner. This connecting part 16*a* is connected to one end of an oil feeding pipe 9 shown in FIG. 1. The other end of this oil feeding pipe 9 is connected to the side face of the engine 4 so that oil is fed to the oil feeding pipe 9 through an oil path (not shown) provided inside the engine 4. This oil is used to create power for rotating the rotor unit and will be described later in detail.

As illustrated in FIGS. 2 and 3, the upper case 12 is a member which is mounted to the lower case 11 from above and sections together with the lower case 11 the housing chamber in which the rotor unit and the like are housed. This upper case 12 includes a tubular main body cover 17 and a disc shaped top face cover 18. The lower end part of the main body cover 17 is hermetically mounted to the upper end part of the lower case 11. The top face cover 18 is hermetically mounted to the upper end part of the main body cover 17 so as to cover the PCV valve. Additionally, the center part of the top face cover 18 is provided with a tubular gas discharge part 19 facing upward. This gas discharge part 19 is a section that discharges post treated blow-by gas and is connected to the breather pipe 3 via an outlet pipe.

Figure 4:
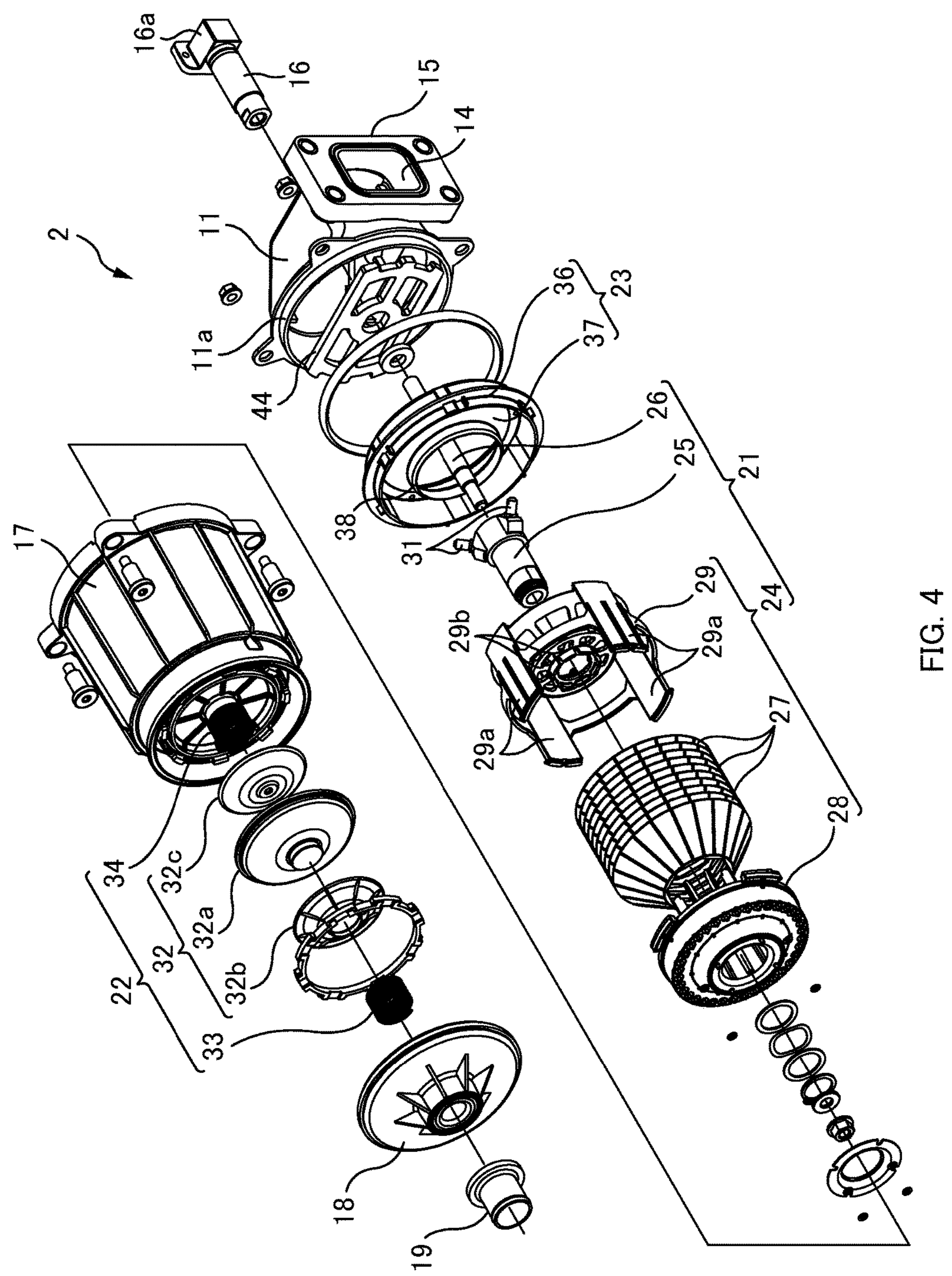
FIG. 4 is an exploded perspective view of the oil separator.

Next, description of the inner structure of the oil separator 2 will be given. As illustrated in FIG. 4, a rotor unit 21, a PCV valve 22 and a sectioning member 23 are arranged in the inner part of the oil separator 2.

Firstly, description of the rotor unit 21 will be given. This rotor unit 21 is a mechanism for separating oil mist which is included in blow-by gas and has a rotor 24, a spindle 25 and a spindle shaft 26.

The rotor 24 is a section which agglomerates the oil mist by rotation and has a plurality of separation discs 27, an upper holder 28 and a lower holder 29. The separation discs 27 are annular plate materials inclined downward toward the outer circumferential side, that is, plate materials which have been worked to be shaped into the side faces of conical frustums. The separation discs 27 of the present embodiment have thicknesses of 1 mm or less and are manufactured by molding resin. These separation discs 27 are layered in the axis direction of the spindle 25. For the sake of description, the separation discs 27 are illustrated with enlarged spaces therebetween, however, the actual spaces are defined to be extremely narrow (e.g. less than 1 mm).

The upper holder 28 is a member for holding the layered plurality of separation discs 27 from above and similarly, the lower holder 29 is a member for holding from below. The outer circumferential edge of the lower holder 29 is provided with a plurality of coupling arms 29*a* for coupling to the upper holder 28. In the present embodiment, four coupling arms 29*a* are provided at 90 degrees intervals in the circumferential direction. The plurality of separation discs 27, the upper holder 28 and the lower holder 29 are integrated by coupling the upper ends of the coupling arms 29*a* to the upper holder 28.

The outer appearance of this rotor 24 is tubular and the inner circumferential side is a hollow section which penetrates in the vertical direction. A spindle 25 is inserted into this hollow section and the spindle 25 and the rotor 24 are coupled to each other. Therefore, the rotor 24 rotates about the axis line of the spindle 25 together with the spindle 25.

Nozzles 31 are provided to protrude from the circumferential face of the spindle 25 at parts below the rotor 24. These nozzles 31 are sections which inject oil fed through a spindle shaft 26 and generate the driving force for rotating the spindle 25 and the rotor 24.

Figure 6:
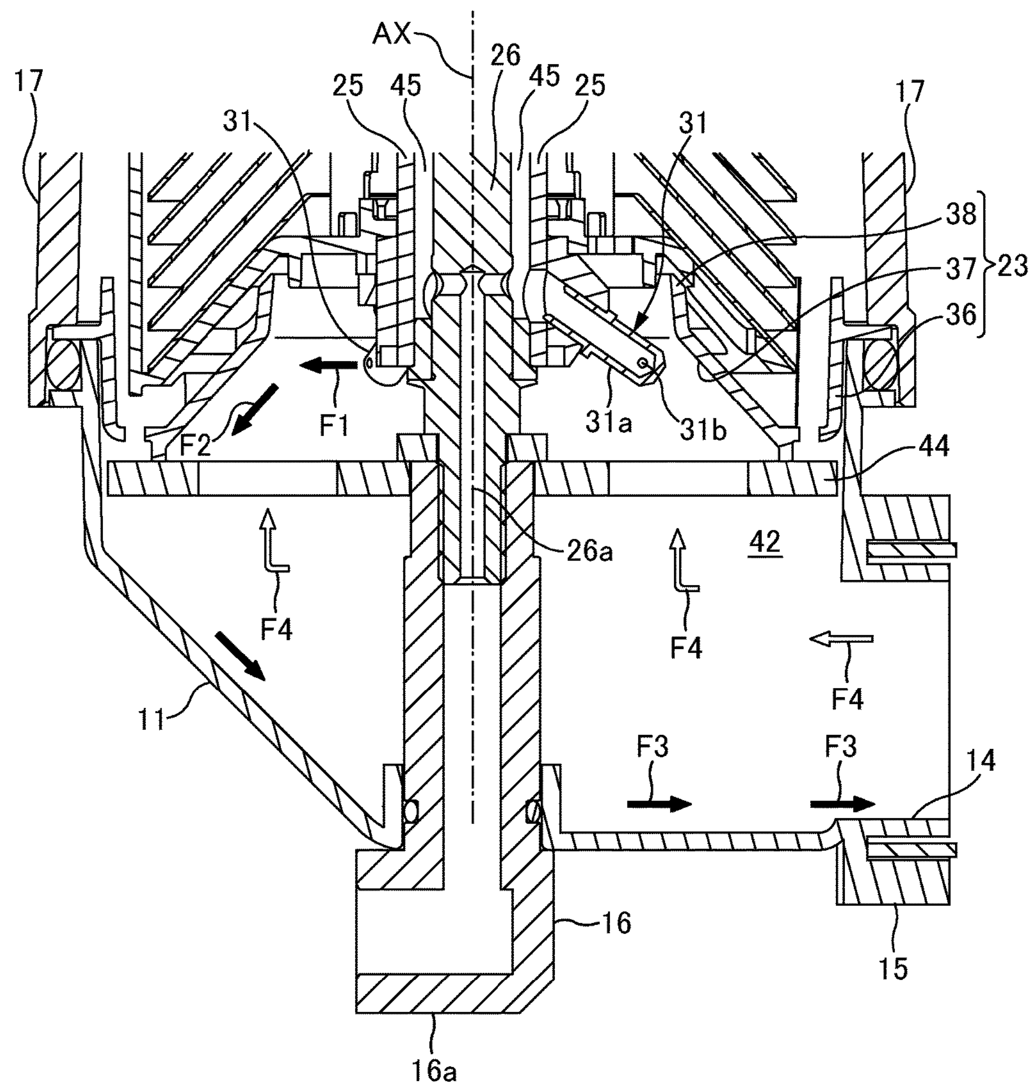
FIG. 6 is a vertical sectional diagram of a lower side section of the oil separator seen from the right side.

As shown in FIG. 6, the nozzle 31 of the present embodiment has a tubular nozzle main body 31*a* end tip of which is closed and a nozzle opening 31*b* provided at the tip end part of the nozzle main body 31*a*. The base end of the nozzle main body 31*a* is connected to the spindle 25 The nozzle main body 31*a* is mounted to the spindle 25, the nozzle main body 31*a* being inclined downward at an angle of 45 degrees with respect to the direction of the axis of the spindle 25. Three nozzle main bodies 31*a* are provided at 120 degrees intervals in the circumferential direction. The nozzle opening 31*b* is provided to the side face at the tip end part of the nozzle main body 31*a*. Specifically, the nozzle opening 31*b* is provided in a direction that intersects the direction of the axis line of the nozzle main body 31*a* as well as the direction which allows oil to be injected in the horizontal direction.

Figure 5:
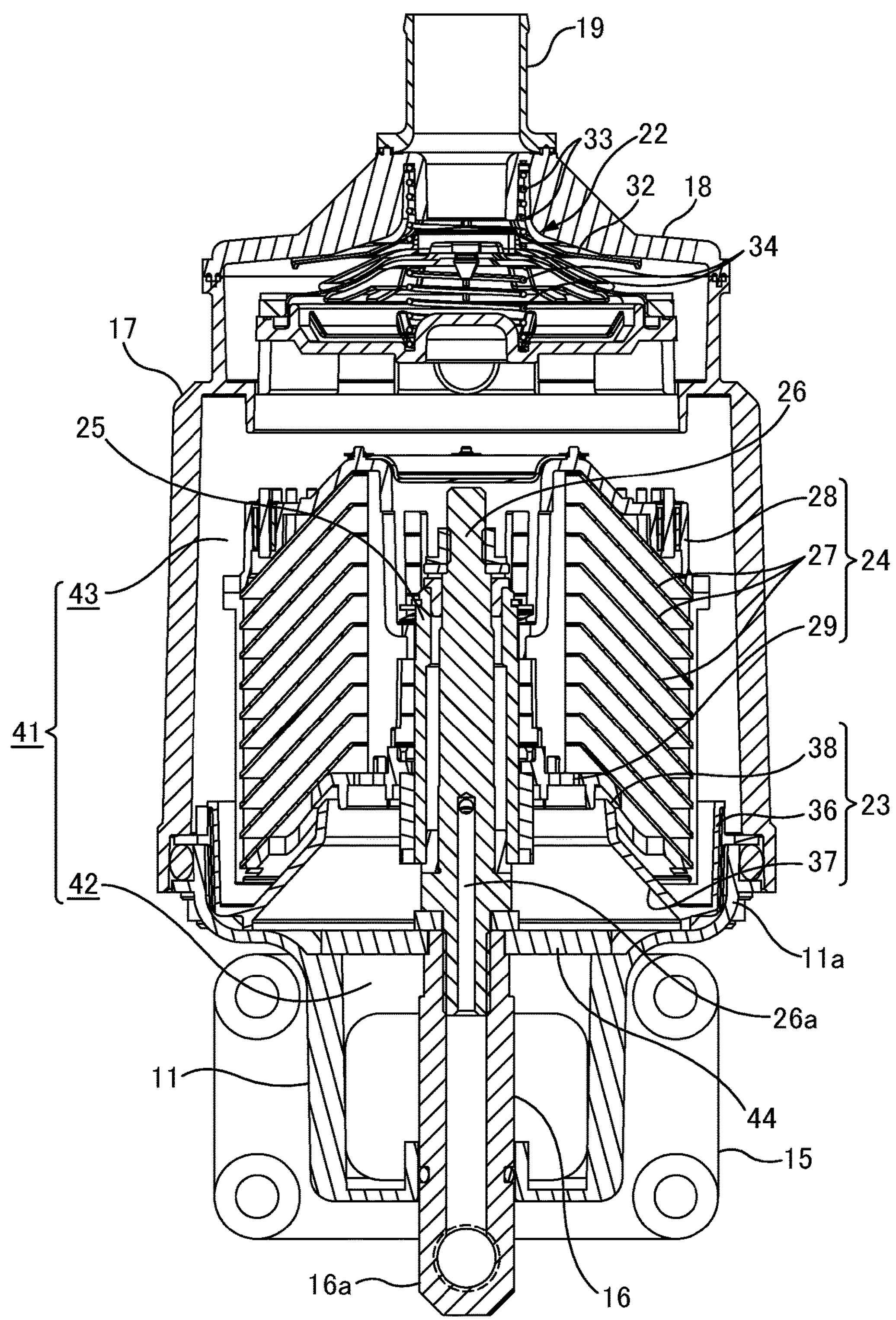
FIG. 5 is a vertical sectional diagram of the entire oil separator seen from the front side.

As illustrated in FIG. 4, the spindle shaft 26 is a cylindrical member which serves as the shaft bearing of the spindle 25 and supports the spindle 25 in a rotatable manner. As indicated in FIG. 5, an oil feeding path 26*a* for feeding oil is formed inside the spindle shaft 26. Additionally, the lower end part of the spindle shaft 26 is joined with the upper end part of the elbow pipe 16. As mentioned above, a connecting part 16*a* of the elbow pipe 16 is connected with the oil feeding pipe 9. Therefore, the oil that has been fed through the oil feeding pipe 9 flows through the elbow pipe 16 and then into the spindle shaft 26. Then, the oil after flowing into the nozzle main body 31*a* is injected from the nozzle opening 31*b*.

Description of the PCV valve 22 will follow. As illustrated in FIG. 4, the PCV valve 22 is equipped with a diaphragm 32, an upper side spring 33 and a lower side spring 34.

The diaphragm 32 is a valving element and is manufactured by forming rubber and resin. The exemplified diaphragm 32 includes a main diaphragm 32*a*, an upper side diaphragm 32*b* and a lower side diaphragm 32*c*. The main diaphragm 32*a* is a disc shaped member made of rubber with a columnar projection formed at the center part thereof and is slightly inclined downward from the center part toward the circumferential edge part. The upper diaphragm 32*b* is a disc shaped member made of resin arranged on the top face of the main diaphragm 32*a* with an opening formed at the center part thereof through which the projection of the main diaphragm 32*a* penetrates. The upper side diaphragm 32*b* is also slightly inclined downward from the center part toward the circumferential edge part. The lower side diaphragm 32*c* is a disc shaped member made of resin arranged on the lower face of the main diaphragm 32*a* and is slightly inclined downward from the center part toward the circumferential edge part.

The upper side spring 33 and the lower side spring 34 are members for supporting the diaphragm 32 in a manner movable in the vertical direction. In other words, the upper side spring 33 is arranged above the diaphragm 32 and the lower side spring 34 is arranged below the diaphragm 32. These upper and lower side springs 33, 34 sandwich and support the diaphragm 32 in a movable manner.

The diaphragm 32 moves in the vertical direction in response to the pressure on the air intake side of the engine 4 and the inner pressure of the crank case, and adjusts the flow of the blow-by gas. In other words, the diaphragm 32 moves to the gas discharge part 19 side (upward) when the air intake pressure (negative pressure) of the engine 4 is excessively high and moves to the other side (downward) when the pressure on the crank case side is high. Hereby, the amount of flow of the blow-by gas can be adjusted appropriately.

Next, description of the sectioning member 23 will be given. The sectioning member 23 is a member which sections the inner space (housing chamber) of the housing 13 into a primary separation chamber (lower housing chamber) and a secondary separation chamber (upper housing chamber) as well as forms a communication opening which guides the gas being the target of treatment (blow-by gas) in the primary separation chamber to the secondary separation chamber. This sectioning member 23 includes an outer circumferential part 36 and a tapered part 37. The outer circumferential part 36 is a section in a short annular shape and has brim part jutting out sideward at the middle part in the height direction. The tapered part 37 is provided on the inner circumferential side of the outer circumferential part 36 and is in a tapered form having the diameter reduced gradually when approaching upward from the lower end of the outer circumferential part 36. And the upper end opening of the tapered part 37 forms the communication opening 38.

As illustrated in FIG. 5, the sectioning member 23 is fit into the fitting part 11*a* of the lower case 11 from the inner circumferential side. Hereby, the tapered part 37 is arranged right below the lower holder 29 included in the rotor 24. The housing chamber 41 is sectioned into a lower housing chamber 42 and an upper housing chamber 43 with the sectioning member 23 as the boundary and these lower and upper housing chambers 42, 43 are communicated through the communication opening 38.

In the lower housing chamber 42, the lower end part of the spindle 25, the lower end part of the spindle shaft 26, the nozzle 31, the elbow pipe 16, a fixing frame 44 and the like. Here, the fixing frame 44 is a member for fixing the upper end part of the elbow pipe 16 to a predetermined location. Meanwhile, in the upper housing chamber 43, the sections above the lower end part of the spindle 25 and the spindle shaft 26, the rotor 24, the PCV valve 22 and the like are arranged.

In the following, the inner structure of the oil separator 2 will be described in the order of the lower housing chamber 42, the parts proximate the rotor of the upper housing chamber 43 and the parts proximate the PCV valve of the upper housing chamber 43.

As illustrated in FIGS. 5 and 6, the lower housing chamber 42 is sectioned by the lower case 11 and the sectioning member 23. The elbow pipe 16 is hermetically mounted upward from the bottom part of the lower case 11. The upper end of the elbow pipe 16 is fixed to the fixing frame 44. The fixing frame 44 is a frame body which is mounted to the bottom part of the fitting part 11*a*. The blow-by gas that has flown in from the communication tube part 14 can move upward through the fixing frame 44.

Further, as illustrated in FIG. 6, a space 45 is provided between the spindle shaft 26 and the spindle 25. This space 45 is provided for guiding the oil which has been discharged from the oil feeding path 26*a* to the nozzles 31. Here, this space 45 constitutes a part of the oil guiding path to guide a part of the oil which has been discharged from the oil feeding path 26*a* to the separation discs 27 which will be described later in detail.

The nozzles 31 are arranged at positions proximate the tapered part 37 of the sectioning member 23. As mentioned above, the nozzles 31 inject oil in the horizontal direction from the nozzle openings 31*b*. Thus, the injected oil is sprayed against the inner face of the tapered part 37 as indicated by an arrow with the reference sign F1. Here, the inner face of the tapered part 37 has a conical face which is inclined from the outer circumferential side toward the center side so that the oil sprayed thereagainst would flow downward as indicated by an arrow with the reference sign F2. Hereby, the injected oil can be positively introduced to the bottom part side of the lower housing chamber 42 and thus can restrain the oil from flowing into the upper housing chamber 43.

Here in the present embodiment, the inclination angle of the tapered part 37 is set to 45 degrees with respect to the axis line AL of the spindle 25, however, the angle is not limited to this. The angle can be set to any angle as long as the injected oil can be made to positively flow toward the bottom part side of the lower housing chamber 42. For example, the inclination angle of the tapered part 37 can be set to 30 degrees or to 60 degrees with respect to the axis line AL.

Further, a film of oil that circles at high speed is formed on the outer circumferential side of the circling path of the nozzle opening 31*b* when the rotor 24 rotates at high speed. When blow-by gas contacts this film of oil, the oil mist included in the blow-by gas is taken into the film of oil and centrifugally separated. Hereby, the amount of oil mist included in the blow-by gas can be reduced. Injecting the oil which becomes the driving source of the spindle 25 and the rotor 24 in the lower housing chamber 42 in this way allows the amount of oil mist included in the blow-by gas to be reduced. For such reason, the lower housing chamber 42 functions as the primary separation chamber of the oil mist.

Furthermore, the oil injected from the nozzles 31 is collected at the bottom part of the lower housing chamber 42 together with the oil separated from the blow-by gas. As indicated with arrows with the reference sign F3, the oil flows along the bottom part of the lower housing chamber 42 and then flows into the communication tube part 14. Thereafter, the oil is returned to the crank case from the side face of the engine 4. As indicated with arrows with the reference sign F4, the communication tube part 14 being a section into which blow-by gas flows, this communication tube part 14 serves as the gas inflow part which allows the blow-by gas to flow in as well as an oil discharge part which allows oil to be discharged toward the engine 4. Hereby, the structure can be simplified.

Figure 7:
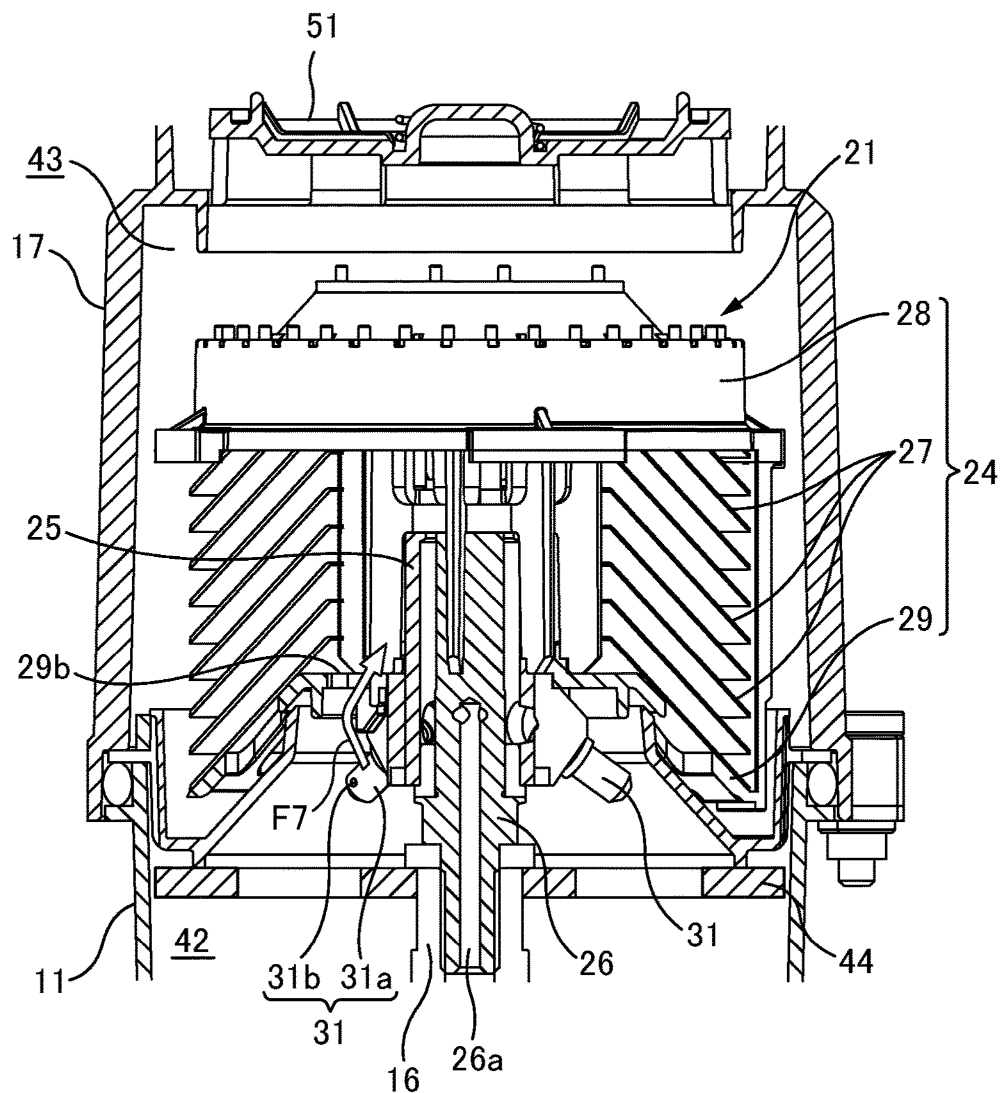
FIG. 7 is a vertical sectional diagram of a mid-section of the oil separator seen from the front side.

Next, description of the parts proximate the rotor of the upper housing chamber 43 will be given with reference to FIGS. 7 and 8. Here also in these drawings, the separation discs 27 are illustrated with enlarged spaces provided therebetween, however, the actual device has the separation discs 27 layered with much narrower spaces than those in the drawings.

As mentioned above, the rotor 24 is coupled to the spindle 25 so as to rotate integrally with this spindle 25. An air through hole 29*b* is formed at the central section of the lower holder 29 and thus the blow-by gas that has passed through the communication opening 38 flows through the air through hole 29*b* and into the hollow section of the rotor 24 as indicated with an arrow with the reference sign F5 in FIG. 8. The blow-by gas that has flown into the hollow section of the rotor 24 moves through the spaces between the separation discs 27 toward the direction of the outer circumference of the rotor 24, as indicated with arrows with the reference sign F6, by the centrifugal force created along with the rotation of the rotor 24. A pressure difference is created between the outer and inner circumferential sides of the rotor 24 when the blow-by gas moves toward the direction of the outer circumference of the rotor 24 by a centrifugal force in the above manner. In other words, the pressure at the inner circumferential side becomes lower than the pressure at the outer circumferential side. With this pressure difference, the blow-by gas in the lower housing chamber 42 can flow easily into the hollow section of the rotor 24, as indicated with an arrow with the reference sign F7 in FIG. 7, thereby improving the treatment efficiency.

The oil mist included in the blow-by gas would adhere to the surface of the separation discs 27 when this blow-by gas contacts the separation discs 27. The adhered oil mist would unite with a different oil mist so that oil is agglomerated on the surface of the separation discs 27. In other words, the oil is secondarily separated. As mentioned above, the blow-by gas has the oil mist primarily separated in the lower housing chamber 42. Therefore, the secondary separation at the separation discs 27 allows the oil mist to be separated from the blow-by gas at a high level. For such reason, the upper housing chamber 43 corresponds to the secondary separation chamber which secondarily separates the remaining oil mist in the blow-by gas from which oil mist has been primarily separated.

Figure 8:
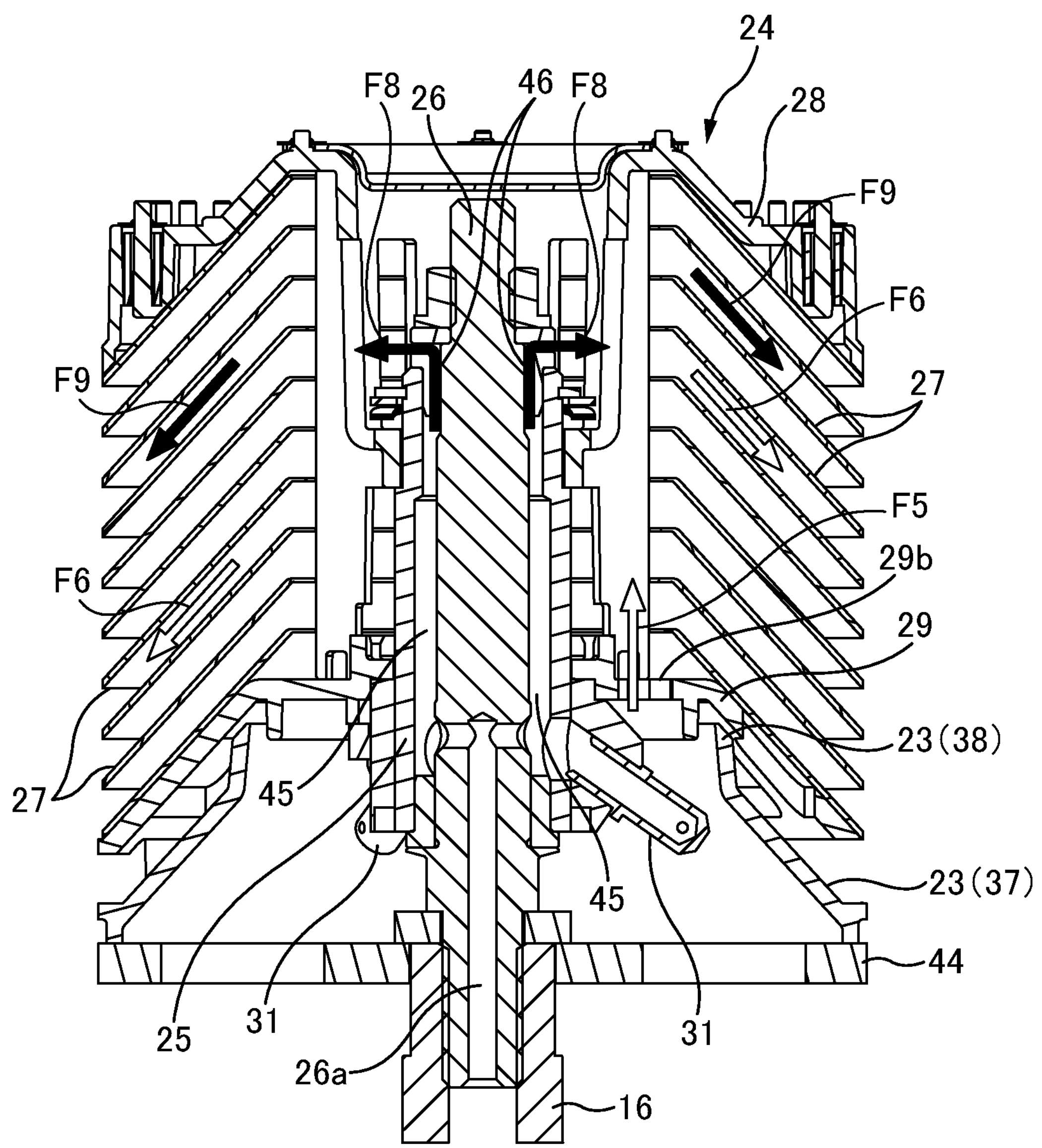
FIG. 8 is a vertical sectional diagram of a rotor.

As illustrated in FIG. 8, a space 45 is formed between the spindle 25 and the spindle shaft 26. This space 45 functions as the oil guiding path and is filled with oil fed to be injected from the nozzles 31. Since the oil feeding pressure is sufficiently high, a part of the oil filled in the space 45 flows through the upper end of the space 45, as indicated with arrows with the reference sign F8, to be emitted to the hollow section of the rotor 24 from the upper end of the spindle 24. The oil emitted to the hollow section of the rotor 24 moves through the spaces between the separation discs 27 toward the direction of the outer circumference of the rotor 24 by the centrifugal force of the rotor 24, as indicated with arrows with the reference sign F9, similar to the case of the blow-by gas. The oil agglomerated on the surfaces of the separation discs 27 at this time unites with the oil emitted to the hollow section of the rotor 24.

In this oil separator 2, a part of the oil fed to be injected from the nozzles 31 is emitted through the space 45 formed between the spindle 25 and the spindle shaft 26 and out to the hollow section of the rotor 24. Hereby, the emitted oil is fed to the spaces between the separation discs 27 and then flows along the surface of the separation discs 27. Thus, the surfaces of the separation discs 27 are cleaned which can prevent clogging caused by the agglomerated oil remaining between the separation discs 27. As a result, maintenance of the separation discs 27 can be simplified.

The oil agglomerated or united on the surfaces of the separation discs 27 is emitted from the outer circumferential edges of the separation discs 27 and after hitting the inner wall face of the main body cover 17, the oil flows down this inner wall face. Further the oil joins the oil injected from the nozzles 31 at the lower housing chamber 42 to be returned to the engine 4. As mentioned above, the separation discs 27 are manufactured using annular plate materials which are inclined downward toward the outer circumferential side. Therefore, the agglomerated oil is emitted obliquely downward from the outer circumferential edges of the separation discs 27. Hereby, the emitted oil can easily flow downward after hitting against the inner wall face of the main body cover 17 so that mixing of splattered oil into the blow-by gas (corresponding to the post treated gas) can be restrained. Next, description of the parts proximate the PCV valve of the upper housing chamber 43 will be given with reference to FIGS. 9 and 10.

Figure 10:
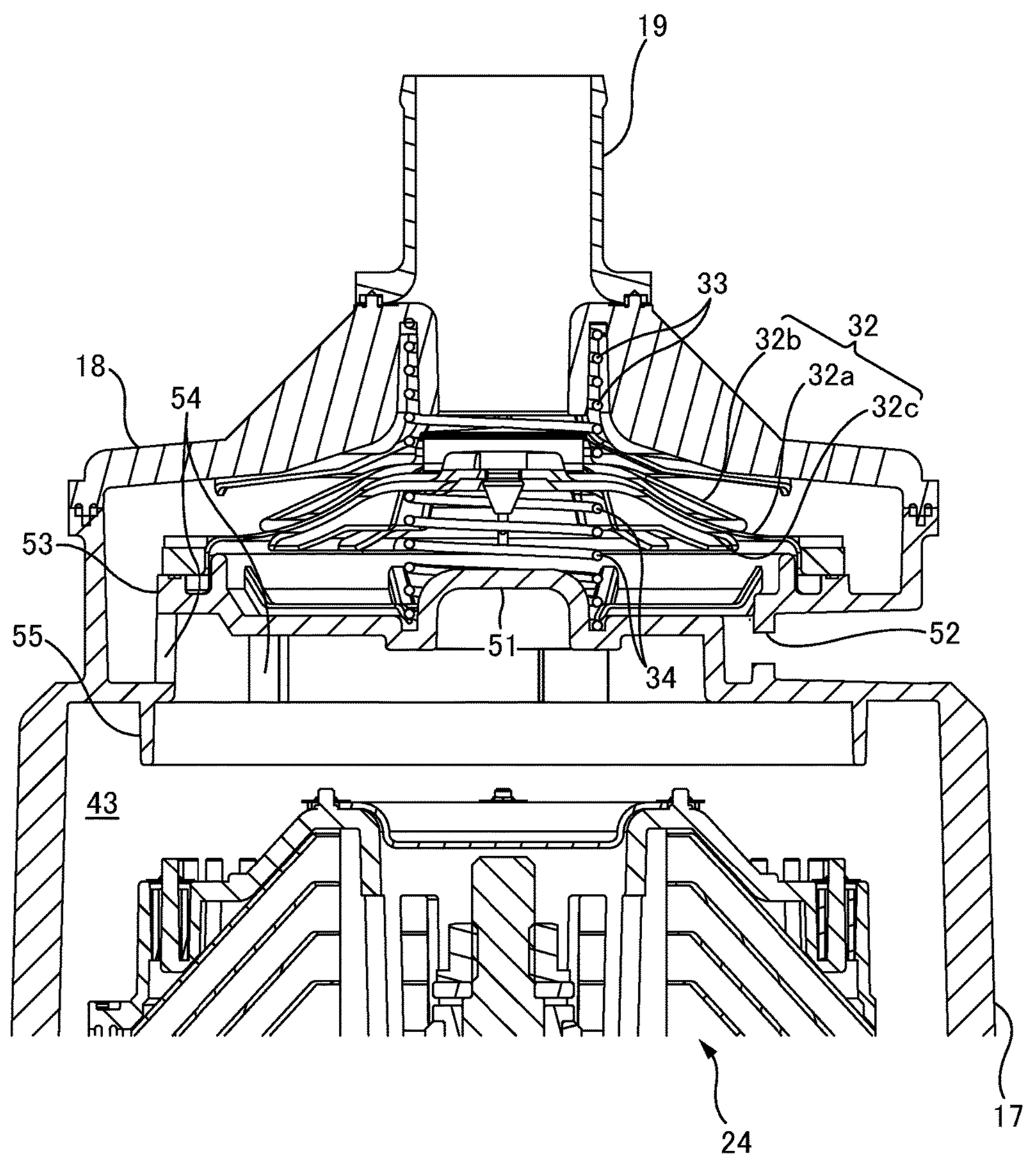
FIG. 10 is a vertical sectional diagram illustrating an enlarged view of parts proximate the PCV valve.

The PCV valve 22 is arranged on the top part (corresponding to the top part of the upper case 12) of the upper housing chamber 43. Specifically, the PCV valve 22 is arranged in a state rested on the platform 51 at a position right under the top face cover 18 in the upper housing chamber 43. As illustrated in FIG. 10, the platform 51 is hermetically covered by the diaphragm 32. A lower side spring 34 is mounted between the platform 51 and the diaphragm 32. Additionally, the space sectioned by the platform 51 and the diaphragm 32 is open to the atmosphere via the atmosphere communication part 52. Meanwhile, an upper side spring 33 is mounted between the top face cover 18 and the diaphragm 32.

With such structure, when the pressure in the upper housing chamber 43 becomes higher than the pressure set to the PCV, the diaphragm 32 moves downward to increase the amount of flow of the blow-by gas. On the other hand, when the pressure in the upper housing chamber 43 becomes lower than the pressure set to the PCV, the diaphragm 32 moves upward to decrease the amount of flow of the blow-by gas. Hereby, the pressure on the crank case side of the engine 4 is maintained within a predetermined range.

Since the diameter of the PCV valve 22 is set equal to or smaller than the diameter of the rotor 24, the upper side case 12 need not be widened diametrically even if the PCV valve 22 is provided. Thus, the device is unsusceptible to constraints by the diametrical size, thereby making it possible to make the device compact.

Figure 9:
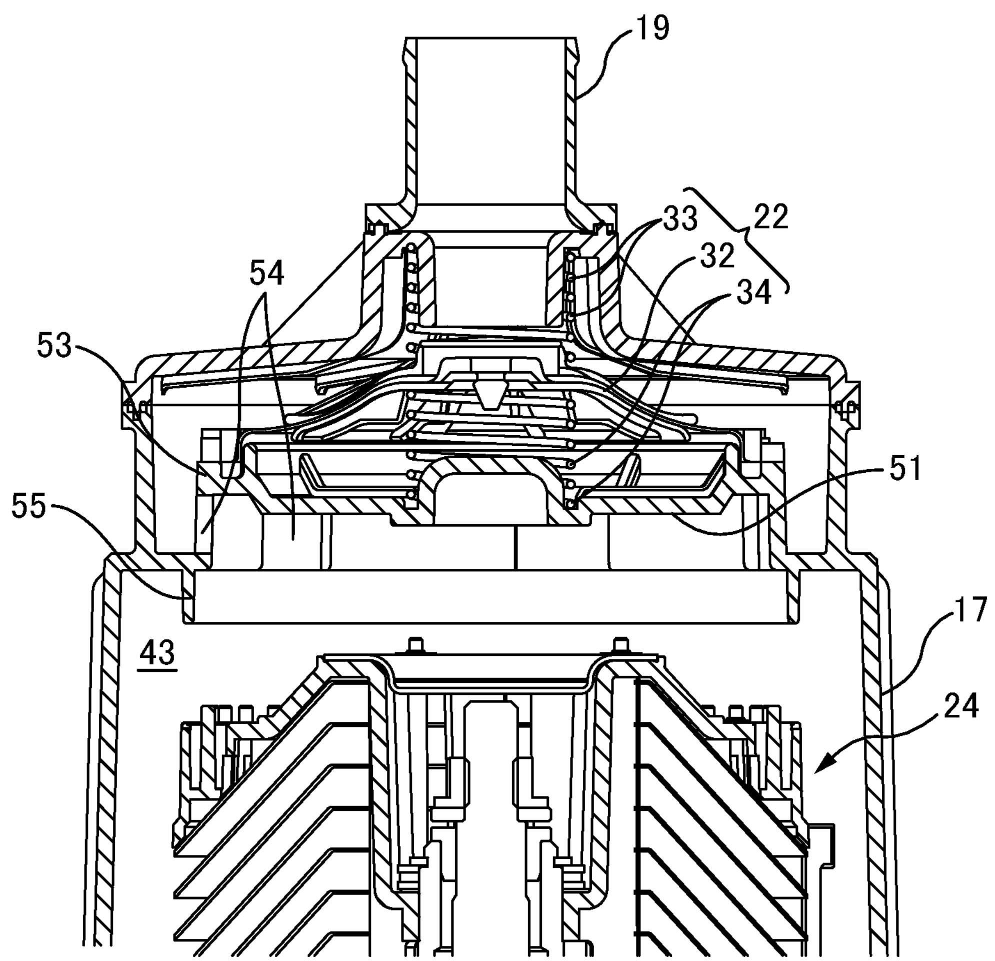
FIG. 9 is a vertical sectional diagram of an upper side section of the oil separator seen from the front side.

As illustrated in FIGS. 9 and 10, the outer circumference of the platform 51 is sectioned by the side wall part 53 which is circular when seen in a planar view. This side wall part 53 is provided with communication openings 54 which communicate the section on the top face side of the diaphragm 32 and the section on the rotor 24 side, in the upper housing chamber 43. A rib 55 is provided on the lower side of the side wall part 53. This rib 55 is provided integral with the main body cover 17, at a height lower than the rotor unit 21 and higher the diaphragm 32. In other words, the rib 55 is manufactured with an annular member (short tubular member) of a diameter slightly smaller than the main body cover 17.

This rib 55 corresponds to the tubular guiding part and guides downward the fluid (oil and blow-by gas) flowing from the outer circumferential side to the inner circumferential side along the inner surface of the main body cover 17, at the upper end part of the main body cover 17. Oil becomes difficult to pass through the communication openings 54 with this rib 55 so that the oil adhering to the PCV valve 22 can be restrained at a high level.

As it is clear from the above description, the oil separator 2 according to the present embodiment has the following advantages.

Firstly, since the communication tube part 14 is provided to introduce the blow-by gas into the lower housing chamber 42, the lower housing chamber 42 can be used also as a drive chamber where the rotor unit 21 is rotated as well as an introduction chamber into which blow-by gas is introduced. Since the lower housing chamber 42 can be used for multiple purposes in this way, the oil separator 2 can be compact.

Figure 11:
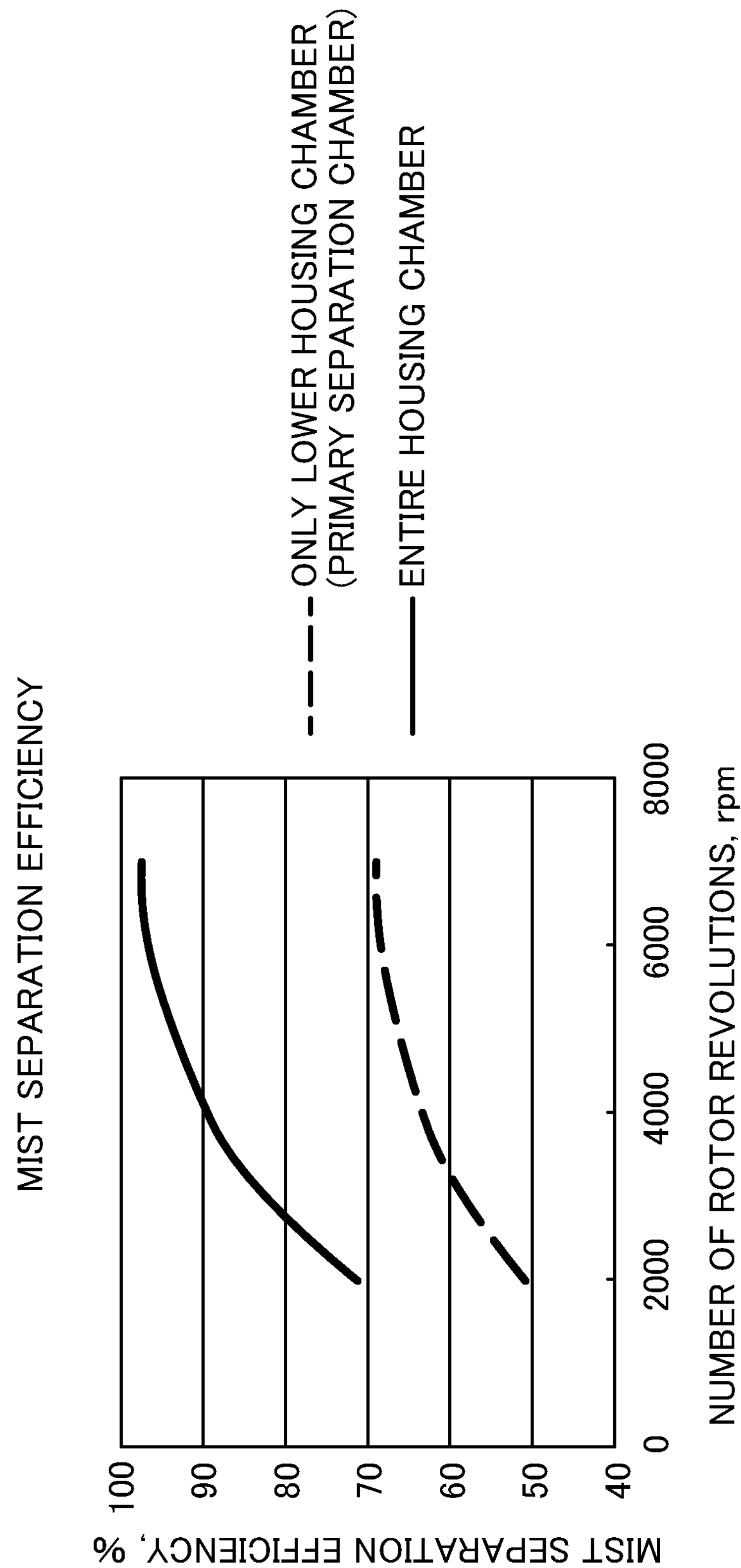
FIG. 11 is a diagram illustrating the relation between the number of rotor revolutions and the separation efficiency of the oil mist.

Further, the lower housing chamber 42 is used as the primary separation chamber for primarily separating the oil mist included in the blow-by gas and the upper housing chamber 43 is used as the secondary separation chamber for secondarily separating the oil mist remaining in the blow-by gas after the primary separation so that the upper housing chamber 43 only has to secondarily separate the remaining oil mist. Hereby, the separation efficiency of the oil mist can be improved. For example, in the example shown in FIG. 11 (the particle diameter of d50 mist being 80 μm), approximately 70% of the oil mist can be separated by the primary separation at the lower housing chamber 42. Further, the removal rate of oil mist after the secondary separation can reach 95% or greater by setting the number of rotor revolutions to 6000 rpm and greater.

Since the lower housing chamber 42 is used as the primary separation chamber in this way, the oil mist can be sufficiently separated even when the number of the required separation discs 27 is lessened or the diameter of the separation discs 27 is reduced. Thus, it is preferable for the oil separator 2 to be further compact by lessening the number of the separation discs 27 or the reducing the diameter thereof.

Further, the oil separator 2 according to the present embodiment has a centrifugal force created by the rotation of the rotor 24 (separation discs 27) so that the blow-by gas flows toward the outer circumferential side of the separation discs 27. In association with this, the pressure in the inner circumferential part of the rotor 24 becomes lower than the pressure in the outer circumferential part 36. Since the lower housing chamber 42 and the hollow section of the rotor (upper housing chamber 43) are communicated by the communication opening 38, the blow-by gas in the lower housing chamber 42 can be easily guided to the hollow section of the rotor 24. Hereby, the blow-by gas can be smoothly flown so as to improve the treatment efficiency.

Furthermore, the gas discharge part 19 that discharges the post treated blow-by gas is provided to the upper end part of the upper case 12 and the PCV valve 22 is provided on the top part (right below the gas discharge part 19) of the upper housing chamber 43. Hereby, the upper case 12 is unsusceptible to constraints by the diametrical size so as to be appropriate for making the device compact of the device. Additionally, the blow-by gas after having oil mist separated at the rotor unit 21 contacts the PCV valve 22. Hereby, oil mist adhering to the PCV valve 22 can be restrained.

The above description of the embodiments is merely for facilitating the understanding of the present invention and is not to be interpreted as limiting the present invention. The present invention can be altered and improved without departing from the gist thereof and equivalents are intended to be embraced therein. For example, the following structures are possible.

In the aforementioned embodiment, the blow-by gas was made to flow into the lower case 11 as well as the oil of the lower case 11 made to be discharged with the communication tube part 14, however, it is not limited to this structure. For example, a gas inflow part which allows blow-by gas to flow into the lower case 11 and an oil discharge part which discharges oil in the lower case 11 can be provided separately. In this case, a pipe for allowing blow-by gas to flow in just has to be joined to the side face of the lower case 11. Further, the elbow pipe 16 and the lower case 11 can be provided integrally.

Further in the aforementioned embodiment, the separation discs 27 were annular plate materials inclined downward toward the outer circumferential side, however, it is not limited to this structure. For example, the separation discs 27 may be annular plate materials inclined upward toward the outer circumferential side. Further, the separation discs 27 may be annular plate materials deformed in corrugated forms toward the outer circumferential side.

Furthermore in the aforementioned embodiment, the structure was made such that the space 45 between the spindle 45 and the spindle shaft 26 was used as an oil guiding path and a part of the oil fed for injecting from the nozzles 31 was guided to the separation discs 27, however, it is not limited to this structure. For example, all the fed oil can be injected from the nozzles 31.

Even furthermore in the aforementioned embodiment, blow-by gas was exemplified as the gas as the target of treatment, however, any type of gas may be used as long as the gas includes oil mist.

REFERENCE SIGNS LIST

1 . . . closed type crankcase ventilation system, 2 . . . oil separator, 3 . . . breather pipe, 4 . . . engine, 5 . . . air intake side flow path of the engine, 6 . . . air filter, 7 . . . turbo charger, 8 . . . charge cooler, 9 . . . oil feeding pipe, 11 . . . lower case, 11*a* . . . fitting part of the lower case, 12 . . . upper case, 13 . . . housing, 14 . . . communication tube part, 15 . . . flange, 16 . . . elbow pipe, 16*a* . . . connecting part, 17 . . . main body cover, 18 . . . top face cover, 19 . . . gas discharge part, 21 . . . rotor unit, 22 . . . PCV valve, 23 . . . sectioning member, 24 . . . rotor, 25 . . . spindle, 26 . . . spindle shaft, 27 . . . separation discs, 28 . . . upper holder, 29 . . . lower holder, 29*a* . . . coupling arms, 29*b* . . . air through hole, 31 . . . nozzle, 31*a* . . . nozzle main body, 31*b* . . . nozzle opening, 32 . . . diaphragm, 32*a* main diaphragm, 32*b* . . . upper diaphragm, 32*c* . . . lower diaphragm, 33 . . . upper spring, 34 . . . lower spring, 36 . . . outer circumferential part of section member, 37 . . . tapered part of section member, 38 . . . communication opening, 41 . . . housing chamber, 42 . . . lower housing chamber, 43 . . . upper housing chamber, 44 . . . fixing frame, 45 . . . space between spindle shaft and spindle, 46 . . . sealing member, 47 . . . platform, 52 . . . atmosphere communication part, 53 . . . side wall part, 54 . . . communication openings, 55 . . . rib, AL . . . axis line of the spindle

The invention claimed is:

1. An oil separator which separates an oil mist included in a gas which is a target of treatment comprising:

a plurality of separation discs which are provided rotatable together with a spindle and are layered in an axis direction of the spindle;

a nozzle which is provided to protrude from a circumferential face of the spindle below the separation discs and configured to rotate the spindle about an axis line by injection of an oil;

a lower case which is provided with a gas inflow part into which the gas being the target of treatment flows and an oil discharge part into which an oil after separation is discharged;

an upper case which is attached from above the lower case and sections together with the lower case a housing chamber in which the spindle, the separation discs and the nozzle are housed; and a sectioning member which sections the housing chamber into a primary separation chamber configured to allow an oil injected from the nozzle to flow down as well as to primarily separate the oil mist included in the gas being the target of treatment which has flown in from the gas inflow part and into a secondary separation chamber in which the separation discs are arranged and which secondarily separates the oil mist included in the gas being the target of treatment from which the oil mist has been primarily separated, and at the same time forms between the nozzle and the separation discs a communication opening which guides into the secondary separation chamber the gas being the target of treatment in the primary separation chamber;

wherein the sectioning member has a diameter reduced toward above and has an upper end thereof set as the communication opening, and includes a tapered part, wherein a nozzle opening of the nozzle from which oil is injected and an inner face of said tapered part lie along a common radial line drawn perpendicular to the axis of the spindle.

2. The oil separator according to claim 1, wherein the gas inflow part and the oil discharge part are structured with a common tubular member.

3. The oil separator according to claim 1, wherein the oil separator further includes a spindle shaft which rotatably supports the spindle and has formed on an inner side thereof an oil feeding path for feeding the oil, wherein a space between the spindle and the spindle shaft functions as an oil guide path for guiding to the separation discs a part of the oil fed to be injected from the nozzle.

4. The oil separator according to claim 1, wherein the oil separator further includes a spindle shaft which rotatably supports the spindle and has formed on an inner side thereof an oil feeding path for feeding the oil, wherein a space between the spindle and the spindle shaft functions as an oil guide path for guiding to the separation discs a part of the oil fed to be injected from the nozzle.

5. The oil separator according to claim 1, wherein a gas discharge part is provided to an upper end part of the upper case and discharges a post treated gas having the oil mist separated.

6. The oil separator according to claim 1, wherein the separation discs are annular plate materials inclined downward toward an outer circumferential side.

7. An oil separator which separates an oil mist included in a gas which is a target of treatment comprising:

a plurality of separation discs which are provided rotatable together with a spindle and are layered in an axis direction of the spindle;

a nozzle which is provided to protrude from a circumferential face of the spindle below the separation discs and configured to rotate the spindle about an axis line by injection of an oil;

a lower case which is provided with a gas inflow part into which the gas being the target of treatment flows and an oil discharge part into which an oil after separation is discharged;

an upper case which is attached from above the lower case and sections together with the lower case a housing chamber in which the spindle, the separation discs and the nozzle are housed; and a sectioning member which sections the housing chamber into a primary separation chamber configured to allow an oil injected from the nozzle to flow down as well as to primarily separate the oil mist included in the gas being the target of treatment which has flown in from the gas inflow part and into a secondary separation chamber in which the separation discs are arranged and which secondarily separates the oil mist included in the gas being the target of treatment from which the oil mist has been primarily separated, and at the same time forms between the nozzle and the separation discs a communication opening which guides into the secondary separation chamber the gas being the target of treatment in the primary separation chamber; wherein the oil separator further includes a spindle shaft which rotatably supports the spindle and has formed on an inner side thereof an oil feeding path for feeding the oil, wherein a space between the spindle and the spindle shaft functions as an oil guide path for guiding to the separation discs a part of the oil fed to be injected from the nozzle, the oil guided by the oil guide path is supplied to the separation discs without being injected from the nozzle.

8. The oil separator according to claim 7, wherein a gas discharge part is provided to an upper end part of the upper case and discharges a post treated gas having the oil mist separated.

9. The oil separator according to claim 7, wherein the separation discs are annular plate materials inclined downward toward an outer circumferential side.

* * * * *